United States Patent
Beer et al.

(10) Patent No.: US 11,774,563 B2
(45) Date of Patent: Oct. 3, 2023

(54) TIME-OF-FLIGHT MODULE AND METHOD TO DETERMINE DISTANCE TO OBJECT

(71) Applicant: ams International AG, Jona (CH)

(72) Inventors: Stephan Beer, Jona (CH); Ioannis Tolios, Jona (CH); David Stoppa, Jona (CH); Qiang Zhang, Jona (CH); Pablo Jesus Trujillo Serrano, Jona (CH); Ian Kenneth Mills, Jona (CH); Miguel Bruno Vaello Paños, Jona (CH); Bryant Hansen, Jona (CH); Mitchell Sterling Martin, Jona (CH); Doug Nelson, Jona (CH)

(73) Assignee: ams International AG, Jona (CH)

( * ) Notice: Subject to any disclaimer, the term of this patent is extended or adjusted under 35 U.S.C. 154(b) by 280 days.

(21) Appl. No.: 16/769,231

(22) PCT Filed: Nov. 30, 2018

(86) PCT No.: PCT/EP2018/083159
§ 371 (c)(1),
(2) Date: Jun. 2, 2020

(87) PCT Pub. No.: WO2019/110447
PCT Pub. Date: Jun. 13, 2019

(65) Prior Publication Data
US 2021/0156976 A1    May 27, 2021

Related U.S. Application Data

(60) Provisional application No. 62/594,067, filed on Dec. 4, 2017.

(51) Int. Cl.
| G01S 7/4865 | (2020.01) |
| G01S 17/10 | (2020.01) |
| G01S 17/48 | (2006.01) |

(52) U.S. Cl.
CPC ............ G01S 7/4865 (2013.01); G01S 17/10 (2013.01); G01S 17/48 (2013.01)

(58) Field of Classification Search
None
See application file for complete search history.

(56) References Cited

U.S. PATENT DOCUMENTS

| 10,145,942 B2 | 12/2018 | Menashe et al. |
| 10,641,872 B2 | 5/2020 | Dussan et al. |
(Continued)

FOREIGN PATENT DOCUMENTS

| EP | 2711667 A1 | 3/2014 |
| EP | 3206045 A1 | 2/2016 |
(Continued)

OTHER PUBLICATIONS

PCT/EP2018/083159 International Search Report and Written Opinion, dated Mar. 4, 2019; 11 pages.
(Continued)

*Primary Examiner* — Michael P LaPage
(74) *Attorney, Agent, or Firm* — Kilpatrick Townsend & Stockton LLP

(57) ABSTRACT

A method of using an optical TOF module to determine distance to an object. The method includes acquiring signals in the TOF module indicative of distance to the object, using a first algorithm to provide an output indicative of the distance to the object based on the acquired signals, using at least one second different algorithm to provide an output indicative of the distance to the object based on the acquired signals, and combining the outputs of the first and at least one second algorithms to obtain an improved estimate of the distance to the object. In some implementations, each of the first and at least one second algorithms further provides an output representing a respective confidence level indicative (Continued)

Spot on Detector from Object at Far Distance

Spot on Detector from Object at Close Distance of how accurately distance to the object has been extracted by the particular algorithm.

10 Claims, 11 Drawing Sheets

(56) References Cited

U.S. PATENT DOCUMENTS

| | | | |
|---|---|---|---|
| 2006/0114333 A1* | 6/2006 | Gokturk | H04N 5/2355 348/222.1 |
| 2013/0181119 A1 | 7/2013 | Bikumandla et al. | |
| 2014/0152975 A1 | 6/2014 | Ko | |
| 2016/0033644 A1 | 2/2016 | Moore | |
| 2017/0090020 A1 | 3/2017 | Buettgen | |
| 2017/0176577 A1* | 6/2017 | Halliday | H01S 5/183 |
| 2017/0176579 A1* | 6/2017 | Niclass | G01S 17/10 |
| 2018/0081043 A1* | 3/2018 | Demirtas | G01S 17/10 |
| 2018/0114346 A1* | 4/2018 | Sun | G06T 11/006 |
| 2018/0364331 A1* | 12/2018 | Yamasaki | G01S 7/4808 |
| 2019/0004156 A1* | 1/2019 | Niclass | G01S 7/4863 |
| 2019/0109977 A1* | 4/2019 | Dutton | H04M 1/0202 |
| 2019/0208183 A1* | 7/2019 | Schmidt | H04N 13/254 |
| 2019/0250257 A1* | 8/2019 | Finkelstein | G01S 7/4863 |
| 2019/0251403 A1* | 8/2019 | Raynor | H04N 13/271 |
| 2020/0256993 A1* | 8/2020 | Oggier | G01S 7/4816 |
| 2020/0300989 A1* | 9/2020 | Glover | G01S 7/4865 |
| 2020/0386890 A1* | 12/2020 | Oggier | G01S 17/894 |
| 2021/0109196 A1* | 4/2021 | Beuschel | G01S 7/4865 |

FOREIGN PATENT DOCUMENTS

| | | | |
|---|---|---|---|
| JP | 2017181279 A | * 10/2017 | G01C 3/06 |
| JP | 2017181279 A | 10/2017 | |
| KR | 20170054221 A | 5/2017 | |
| TW | 201330613 A1 | 7/2013 | |
| TW | 201643464 A | 12/2016 | |
| TW | 201735565 A | 10/2017 | |
| WO | 2017198038 A1 | 11/2017 | |

OTHER PUBLICATIONS

Office Action from related TW application No. 107143226, dated Feb. 13, 2023.

* cited by examiner

TIME-OF-FLIGHT MODULE AND METHOD TO DETERMINE DISTANCE TO OBJECT

CROSS-REFERENCE TO RELATED APPLICATIONS

This application is a 371 U.S. National Phase of PCT International Patent Application No. PCT/EP2018/083159, filed on Nov. 30, 2018, which claims benefit and priority to U.S. provisional patent application No. 62/594,067, filed on Dec. 4, 2017, the disclosures of which are each incorporated by reference herein in their entirety.

FIELD OF THE DISCLOSURE

The present disclosure relates to distance time-of-flight modules.

BACKGROUND

Time-of-flight (TOF) sensors, for example, can be used to detect the distance to an object. For example, in direct TOF techniques, a single, very short pulse can be directed toward, and reflected by, an object. The TOF sensor can be used to resolve distance based on the known speed of light by measuring the time-of-flight of a light signal between the sensor and the object. The circuitry in the TOF sensor can use signals from the pixels to calculate, for example, the time the light has taken to travel from the emitter to an object of interest and back to the focal plane array. The TOF sensor can be implemented, for example, as an integrated sensor chip.

At close distances, a number of potential problems can impact the accuracy of TOF distance measurements. First, optical cross-talk (e.g. reflections from a cover glass and/or smudges on the cover glass) and target reflection peaks may overlap and cannot be distinguished well. Also, for very close objects, the parallax effect can reduce the magnitude of the detected signal.

It would be desirable to develop techniques to improve the accuracy of measurements of proximity and distance using optical TOF devices.

SUMMARY

The present disclosure describes distance TOF modules and method of using such TOF modules.

In one aspect, for example, the present disclosure describes a method of using an optical TOF module to determine distance to an object. The method includes acquiring signals in the TOF module indicative of distance to the object, using a first algorithm to provide an output indicative of the distance to the object based on the acquired signals, using at least one second different algorithm to provide an output indicative of the distance to the object based on the acquired signals, and combining the outputs of the first and at least one second algorithms to obtain an improved estimate of the distance to the object.

In another aspect, the disclosure describes a TOF module that includes an optical emitter operable to emit radiation of a particular wavelength out of the module, a TOF sensor operable to detect radiation of the particular wavelength reflected by an object outside the module, and one or more processors operable to use a first algorithm to provide an output indicative of distance to the object based on the detected radiation, use at least one second different algorithm to provide an output indicative of the distance to the object based on the detected radiation, and combine the outputs of the first and at least one second algorithms to obtain an improved estimate of the distance to the object.

In some implementations, each of the first and at least one second algorithms further provides an output representing a respective confidence level indicative of how accurately distance to the object has been extracted by the particular algorithm.

Other aspects, features and advantages will be readily apparent from the following detailed description, the accompanying drawings and the claims.

DETAILED DESCRIPTION

Various methods can be used for determining the object distance at close range from a histogram of the TOF sensor. The performance of each method depends on the object distance as well as environmental conditions (e.g. target reflectivity, ambient light, cover glass properties, air gap between detector and cover glass, smudge on cover glass). Thus, different methods may have different respective ranges of parameters for which they yield relatively accurate results.

Figure 1:
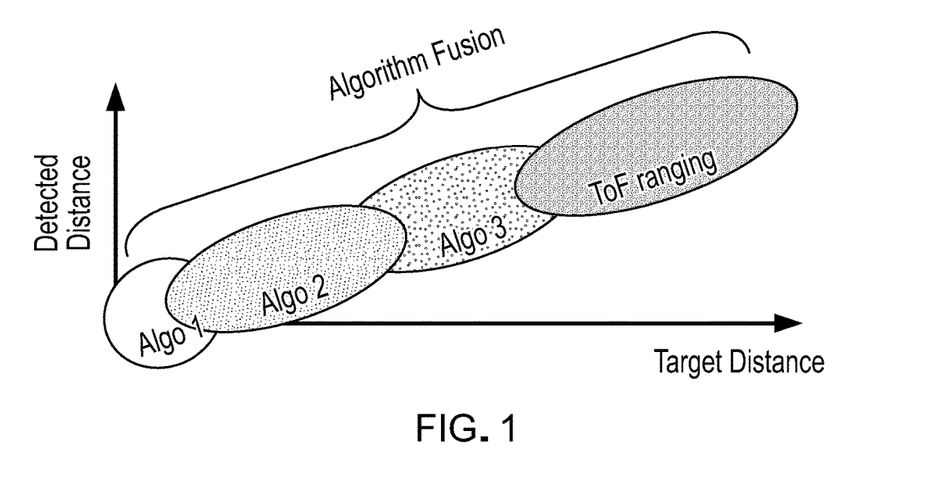
FIG. 1 illustrates an example of the combination of multiple algorithms to a final distance output.

As described below, in accordance with one inventive aspect, multiple different distance measurement techniques are combined in a synergetic manner to obtain improved distance estimation over a wide range of conditions. A top-level algorithm combines the output of two or more selected lower-level algorithms as shown, for example, in FIG. 1. Each of the lower-level algorithms can generate an output not only of a distance estimate, but also a confidence level. The confidence level is indicative of how accurately the distance has been extracted by the particular lower-level algorithm.

Figure 2:
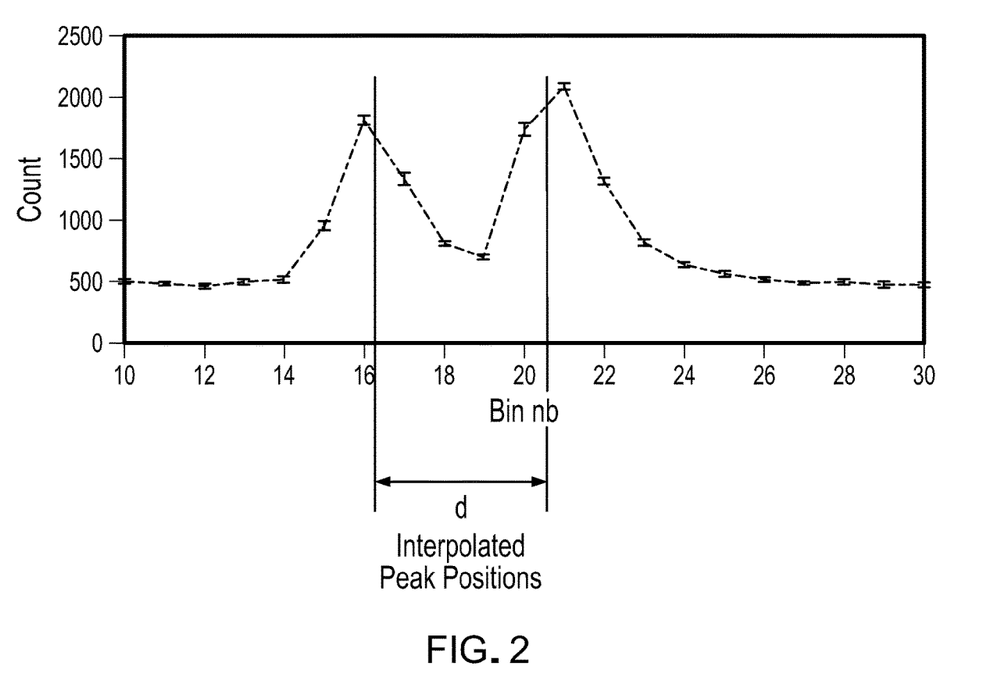
FIG. 2 is an example of a graph of bin number versus number of counts.

A first approach relies on detection of dual peaks. Very short pulse width and high time-to-digital converter (TDC) resolution can permit measuring the distance for close objects as well as those further away. In some instances, there are two peaks in the histogram representing the results of the measurements: one peak represents signals reflected from the cover glass and/or from optical cross-talk, and a second peak represents signals reflected from the object(s) of interest. See the example of FIG. 2, which is a graph of bin number versus number of counts, and which shows two peaks. The distance to the object can be determined by calculating the distance between the two peaks or by the distance between the object peak (or the merged object/ cross-talk peak) and a reference single photon avalanche diode (SPAD) peak. In some cases, an extracted peak may lie in between bins.

Pile up can lead to a left shift of the peak and is approximately proportional to the signal power of the peak. To compensate for pile up, a right shift can be applied. The amplitude of the right shift can be, for example, a proportion of the peak height, interpolated peak height, or estimation of the peak energy; in some instances, it even can take into account the peak shape.

Ambient light also may lead to distortion of the histogram. A background measurement obtained, for example, while the active illumination is switched off, or a signal derived from the background measurement with less noise (e.g. a fit) can be used to correct for the distortion. Compensation of the left shift of the peak resulting from pile up because of ambient light can be performed in a manner similar to the compensation for pile up resulting from the signal peak. Parameters for correction may be different and can take into account the background measurement.

Figure 3A:
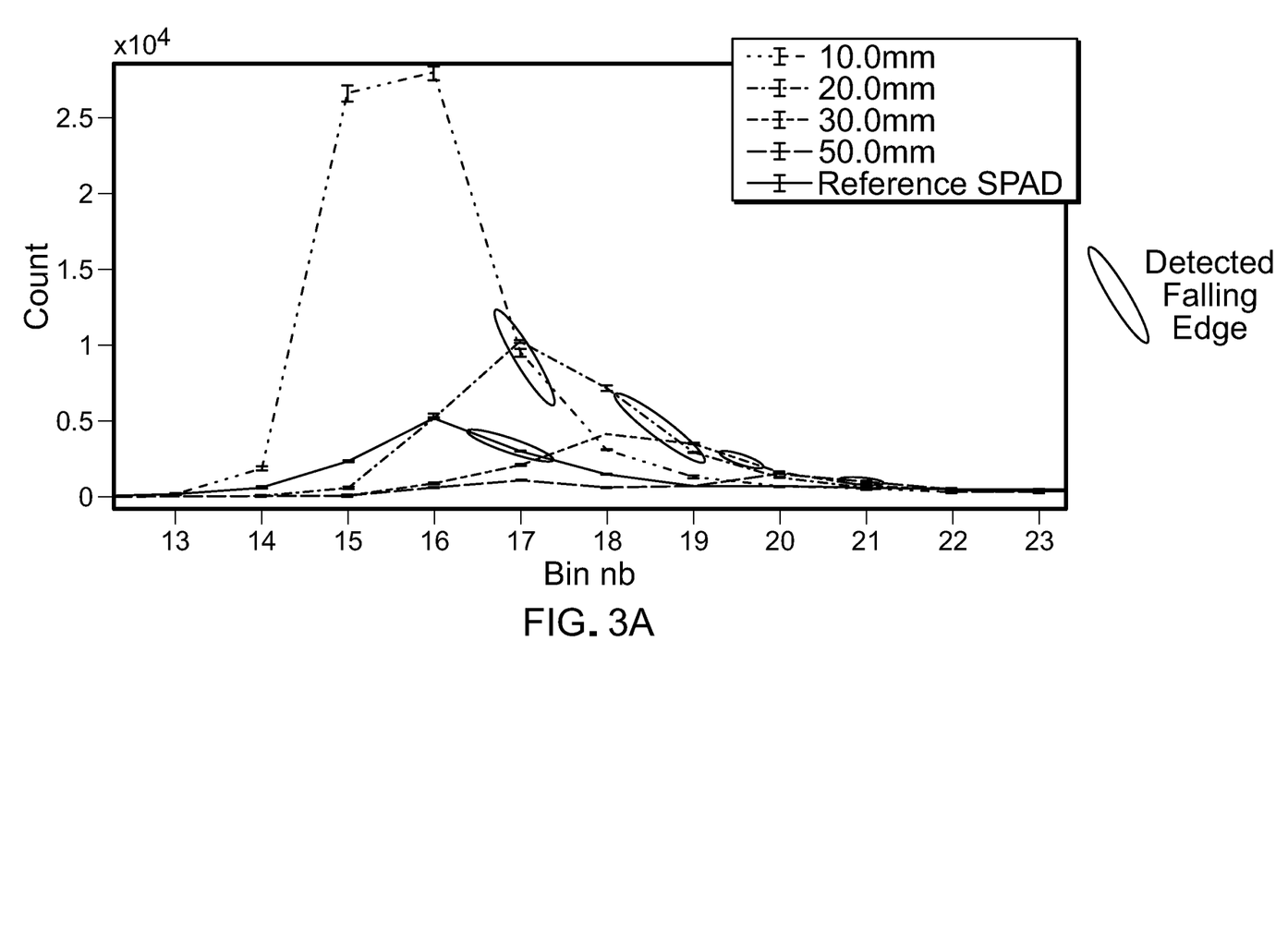
FIGS. 3A and 3B illustrate examples of peak falling edge detection using a center of mass calculation.
Figure 3B:
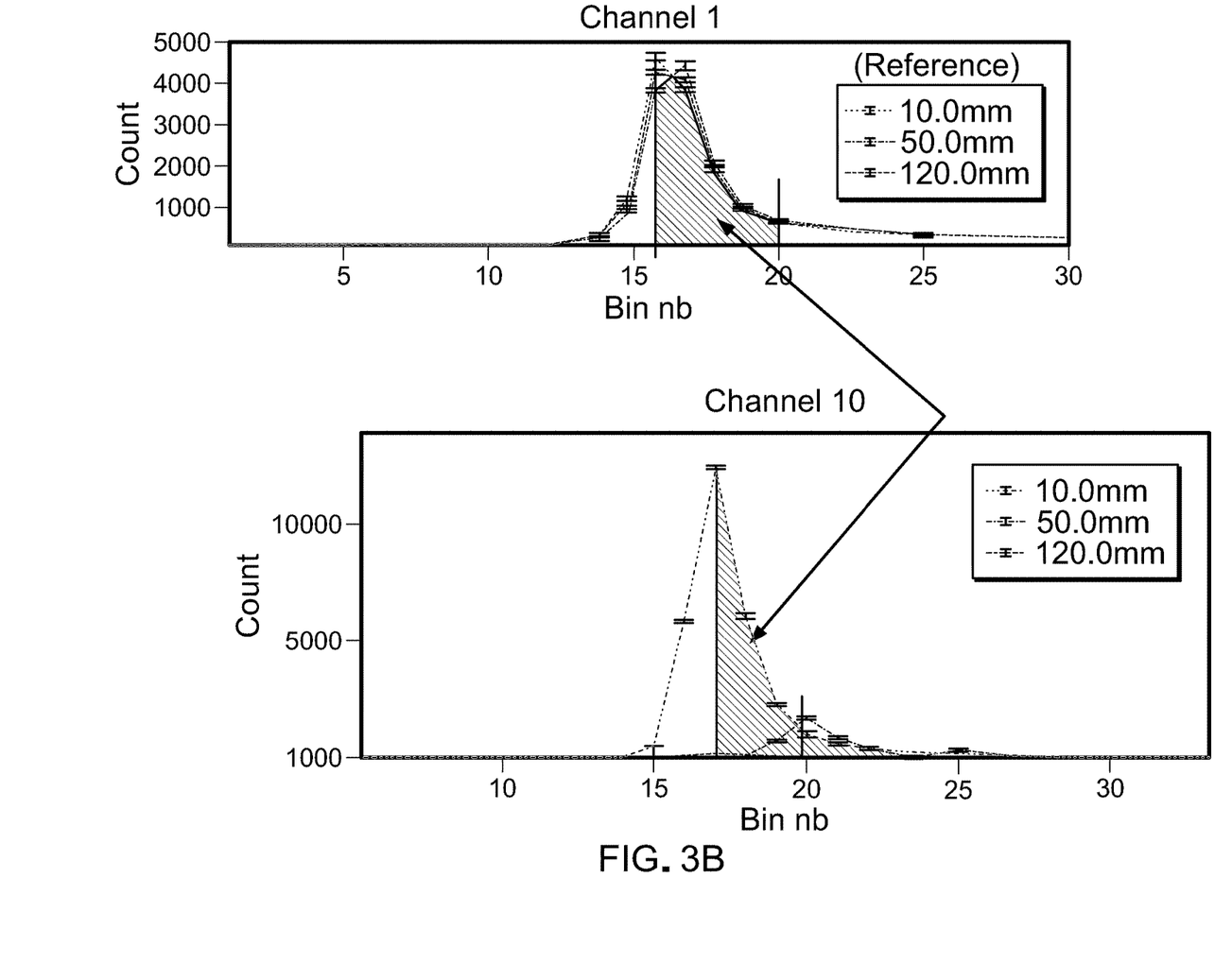

The interpolated peak position can be detected by various techniques such as maxima detection, interpolation, center of mass calculation, or pulse fitting. Before performing the peak detection, the histogram can be filtered to reduce the noise, A second approach relies on detection of a peak falling (or rising) edge. This approach can be used when the two peaks in the histogram are distinguishable, but it can also be used, when the cross-talk and the object peak are merged. For example, in some instances, the falling edge of the peak is detected and compared to the falling edge of a reference as shown, for example, in FIG. 3A. The falling edge can be detected, for example, by thresholding (i.e., the location where the falling edge crosses a certain value, typically relative to the maximum peak amplitude or interpolated peak amplitude). Thresholding also can include interpolation of the falling edge to increase accuracy and reduce the noise. The falling edge can be detected in other ways, such as fitting or center of mass calculation of the falling edge part of the peak. FIG. 3B illustrates an example for a center of mass calculation and includes a comparison of the center of gravity of the falling edge of a reference SPAD peak and an object SPAD peak. In some implementations, instead of the falling edge, the rising edge can be detected. Detecting the rising edge can be advantageous, for example, for non-black targets.

Figure 4:
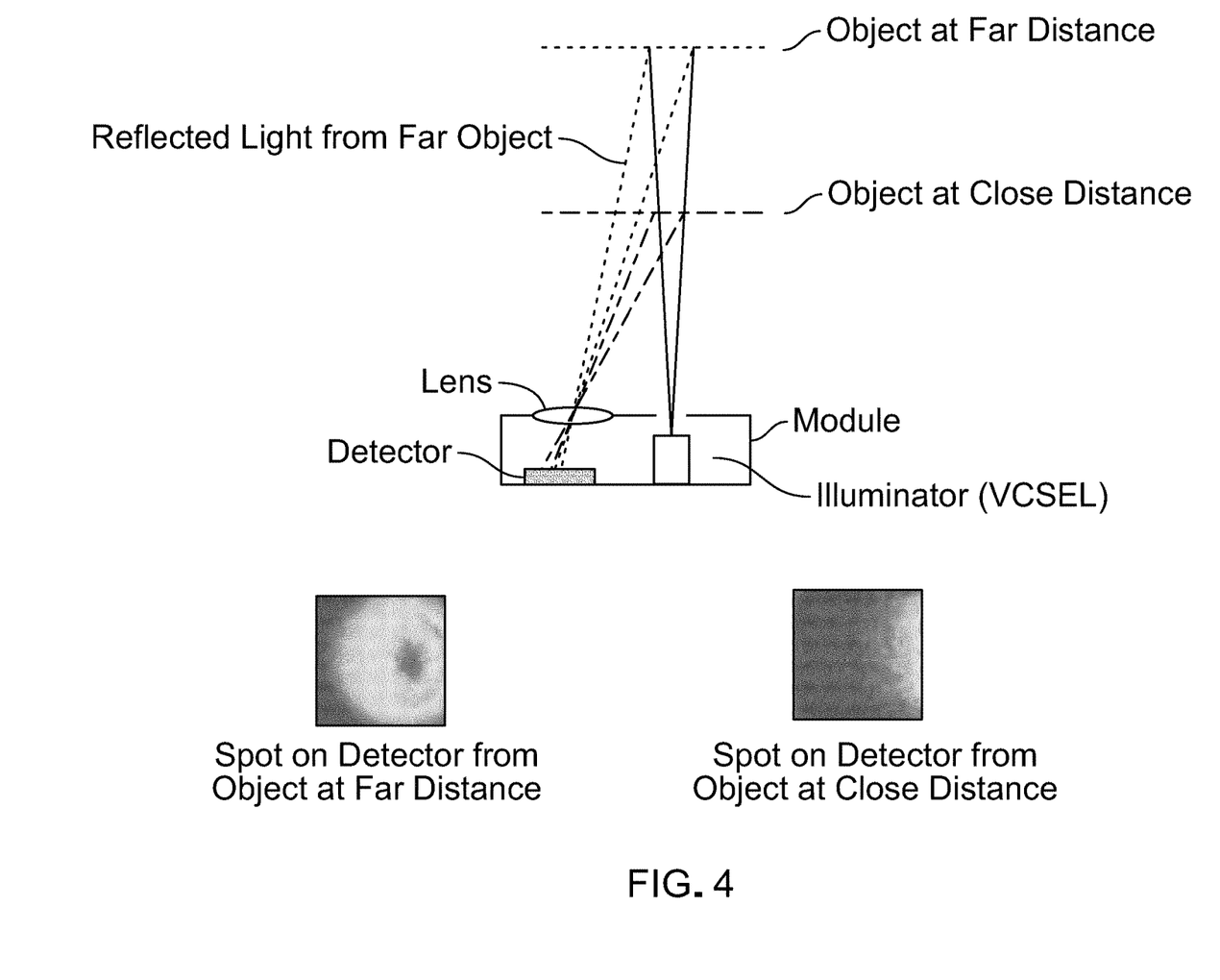
FIG. 4 illustrates an example of distance determination using triangulation based on the parallax effect.
Figure 5A:
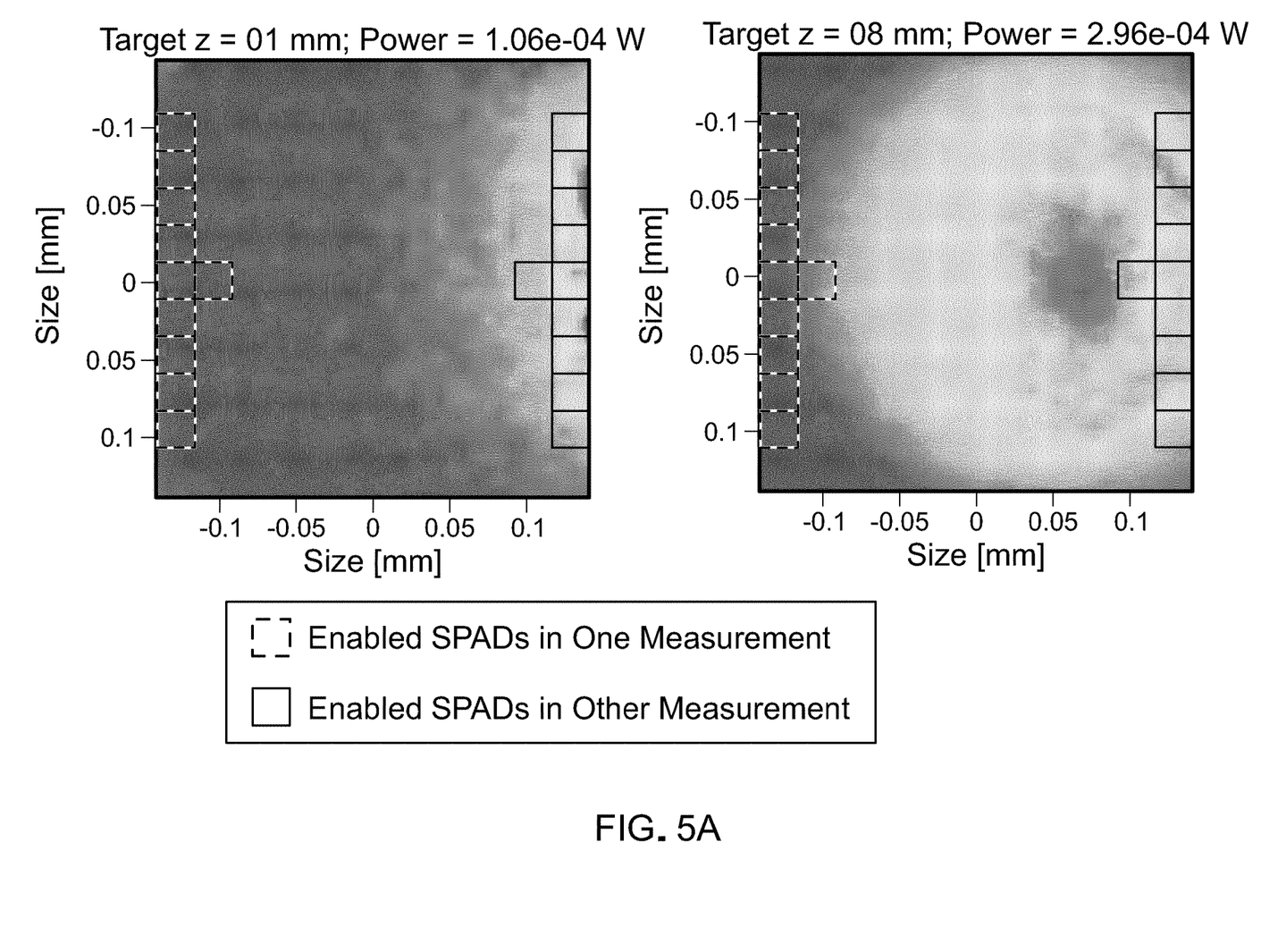
FIGS. 5A and 5B illustrate simulation examples of the impact of the parallax effect on the illumination of a photodetector.
Figure 5B:
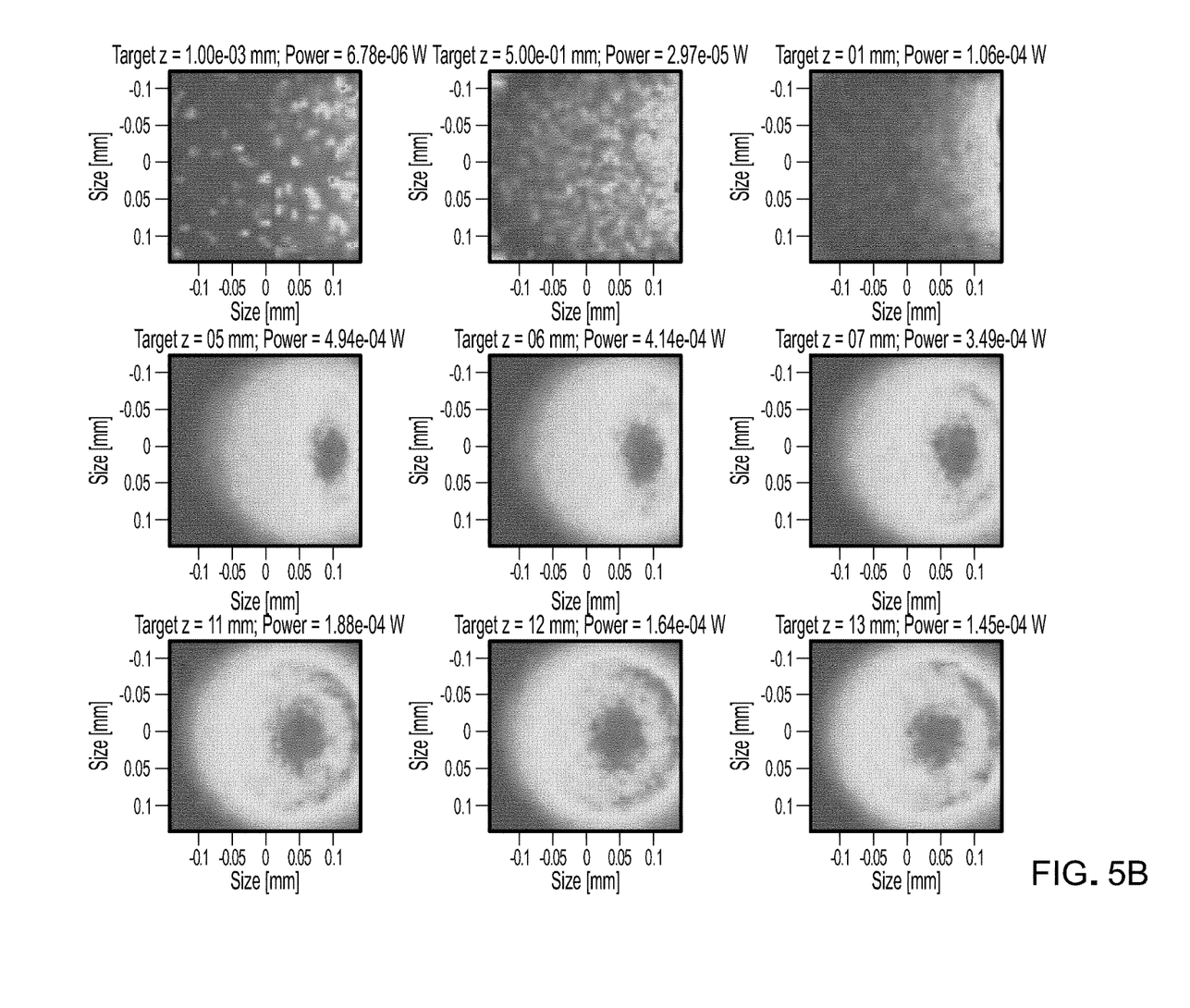

In some implementations, the parallax effect is used to detect very close objects and uses triangulation for distance calculation. See the example of FIG. 4. Thus, the position of a spot of the illumination beam reflected by the object depends on the object distance. The spot location (in one dimension) is extracted from the measurement to calculate the object distance. The location can be extracted if the detector has several pixels that can be read out individually, for example, with several TDCs. If SPADs in the detector array can be enabled/disabled individually, the location of the spot can be detected by two measurements with different SPADs enabled. See the example of FIGS. 5A and 5B. For the illustrated example, optical simulation shows the irradiance on the SPAD array at target distances of 1 mm and 8 mm. In some instances, more than two measurements, having different SPAD settings, can be acquired to improve the robustness of the location extraction. Also, several optimized pattern can be used, or the full detector can be used if each of half has its own TDC. Calibration can be applied to compensate for deterioration of the detected signal that may occur as a result of manufacturing tolerances.

Figure 6:
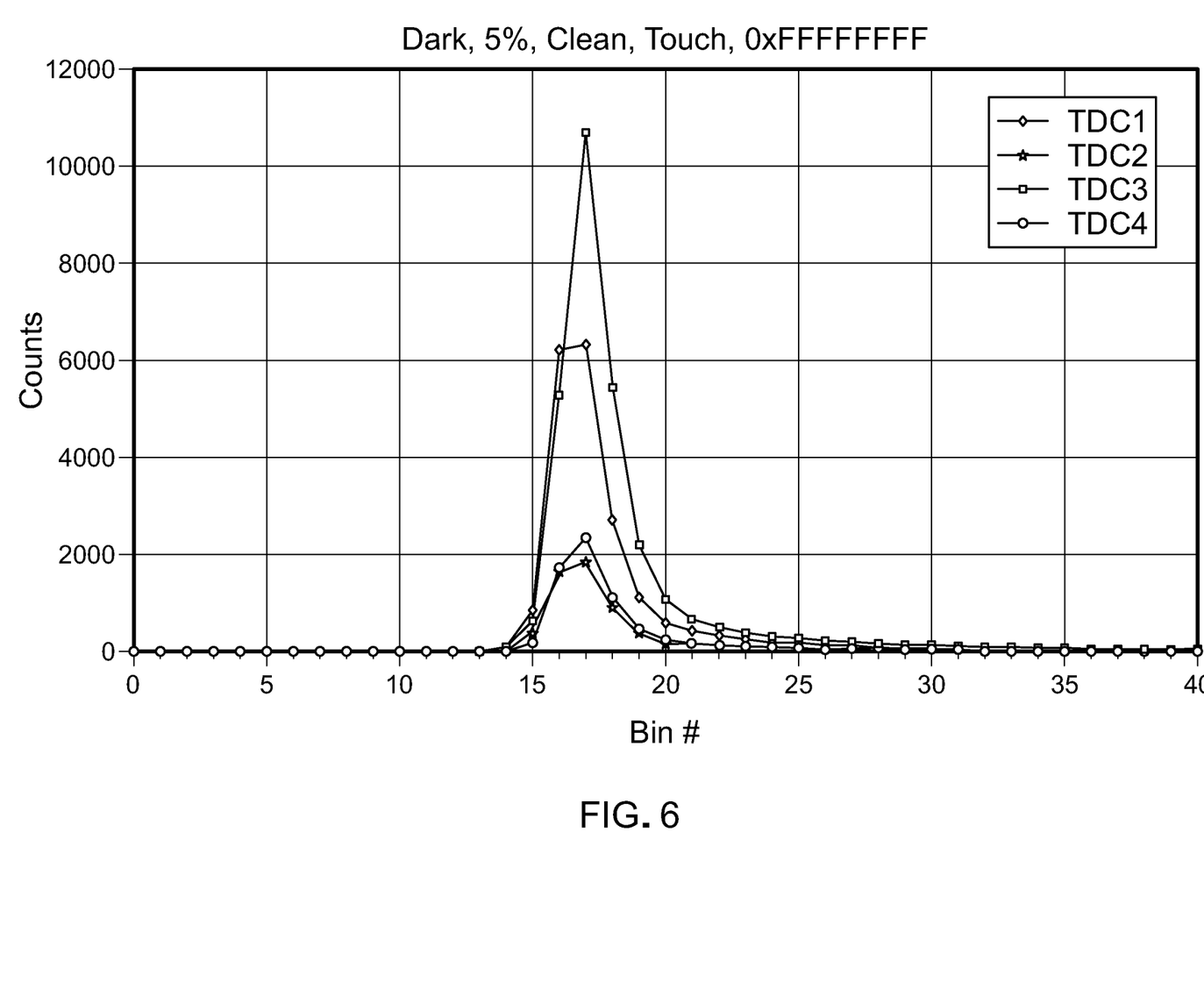
FIG. 6 illustrates an example of a graph of bin number versus counts for four channels.

FIG. 6 illustrates an example of a graph of bin number versus counts for four channels in which TDC1, TDC3 and TDC2, TDC4 are respectively on the same half of the detector. The cross-talk calibration measurement (no target/infinity or very low reflectivity target) can be determined as follows:

$$O_{inf} = g * S_{CG} + \text{offset}$$

The default spot location calibration measurement (target measurement) can be determined as follows:

$$O_{eff} = g * (S_{CG} + S_{TG}) + \text{offset}$$

The object histogram then can be compensated with the calibration measurement. The comparison of the measurements (i.e., channels) allows for estimation of the distance. In some cases, instead of calibration at infinity, a histogram measurement at a defined object distance can be used to extract both calibration data sets.

Figure 7A:
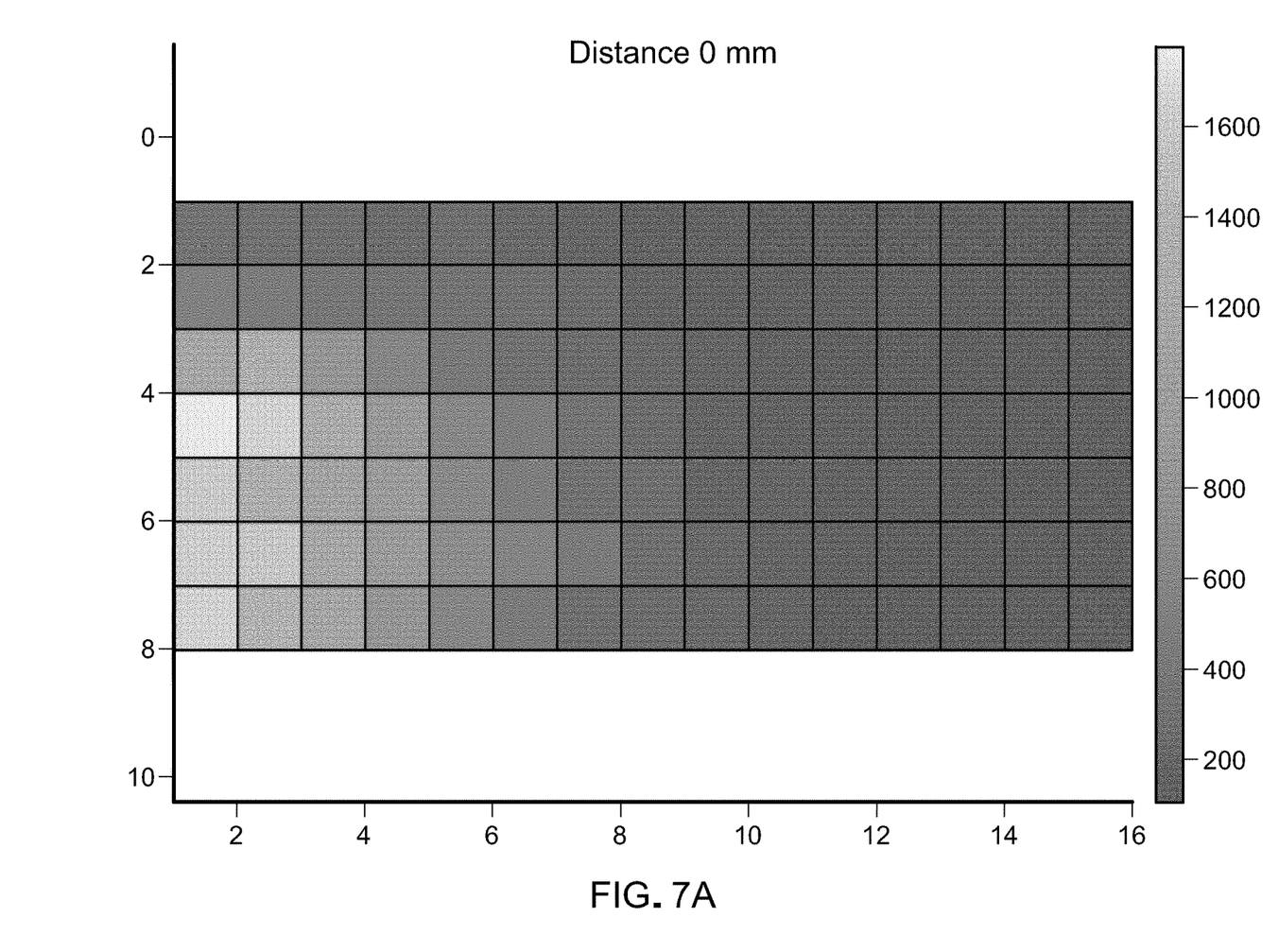
FIGS. 7A and 7B illustrate an example of distance determination using triangulation based on the parallax effect based on use of the TOF detector's intensity mode.
Figure 7B:
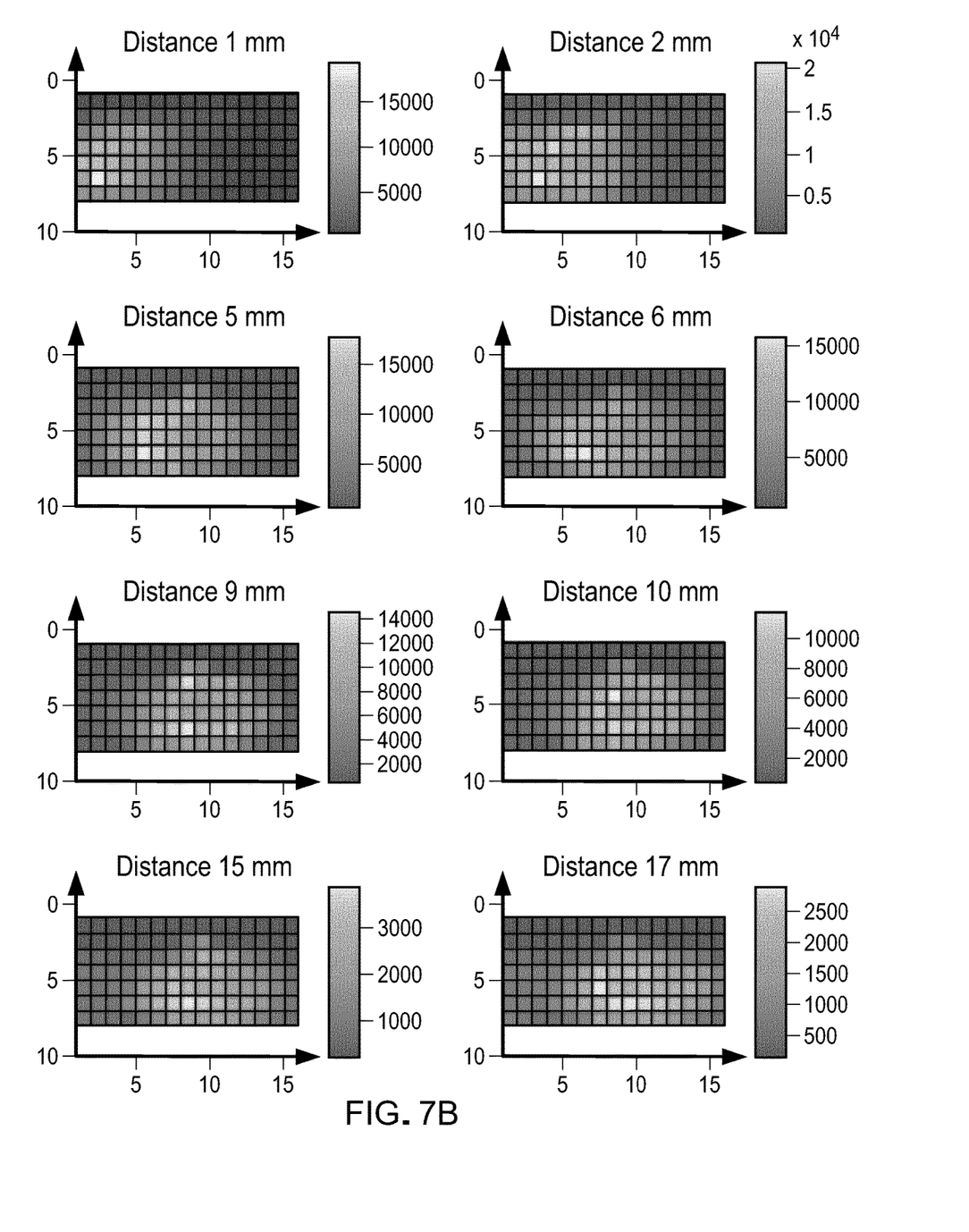

In some cases, the TOF detector is operable in an intensity mode, which allows for measuring the light rate of every SPAD within one measurement. In such cases, the center of mass of this measurement can be used to estimate the parallax and determine the object distance. FIGS. 7A and 7B show examples of intensity measurements with several target distances. The center of mass is compared to the center of mass of a calibration measurement without a target and/or to a calibration measurement with a target at a defined distance. To improve the robustness of the measurement, the calibration measurement without a target can be subtracted from the object measurement before calculating the center of mass. The calibration measurement called "without a target" can be done, for example, using a very black target.

A third approach for determining distance at close range is intensity-based. At close distances, the reflected power is relatively large. The distance TOF proximity module can be used in a manner similar to a conventional intensity-based proximity detector. In this case, instead of using the distance information, an estimate for reflected power is determined (e.g. peak maximum, peak integral, sophisticated fitting function).

In some cases, the detected histogram may show crosstalk, but no background signal (i.e., substantially constant level on all bins). The reason for this result likely is that the TOF sensor (or the cover of the device housing the TOF sensor) is in contact with an object that is blocking all or substantially all the ambient light. Thus, in such cases, processor associated with the TOF module can be programmed to assume that an object (e.g., a user's finger, ear or other body part) is in contact with the TOF sensor or the host device.

As indicated above, the TOF module can include a reference SPAD that receives optical signals resulting from reflections in the package as well as from the cover glass disposed over the TOF module. If an object is very close, light also may be reflected by the object back into the transmitter aperture and to the reference SPAD. The change in the signal detected by the reference SPAD can be used to estimate the object distance. Changes in the reference SPAD histogram can be, for example, an increase of the peak amplitude or a broadening of the peak.

Various aspects of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus" and "computer" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet. The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the invention. Accordingly, other implementations are within the scope of the claim(s).

The invention claimed is:

1. A method of using an optical time-of-flight (TOF) module to determine distance to an object, the method comprising:
   emitting radiation by an optical emitter;
   acquiring signals by a TOF sensor indicative of distance to the object, wherein acquiring signals comprises detecting radiation reflected by the object, and wherein the TOF sensor comprises an array of single photon avalanche diodes on a single substrate, the array of single photon avalanche diodes comprising a first set of single photon avalanche diodes and a second set of single photon avalanche diodes;
   performing a first measurement of the detected radiation by the first set of single photon avalanche diodes, wherein during the first measurement only the first set of single photon avalanche diodes is enabled;
   producing a first histogram corresponding to the first measurement;
   performing a second measurement of the detected radiation by the second set of single photon avalanche diodes, wherein during the second measurement only the second set of single photon avalanche diodes is enabled;
   producing a second histogram corresponding to the second measurement;
   using a first algorithm to provide an output indicative of the distance to the object based on the acquired signals;
   using at least one second different algorithm to provide an output indicative of the distance to the object based on the acquired signals;
   wherein at least one of the first and second algorithms comprises detecting parallax shift of the radiation reflected by the object and comparing the first and second histograms; and
   combining the outputs of the first and at least one second algorithms to obtain an improved estimate of the distance to the object.

2. The method of claim 1 wherein each of the first and at least one second algorithms further provides an output representing a respective confidence level indicative of how accurately distance to the object has been extracted by the particular algorithm.

3. The method of claim 1 wherein at least one of the algorithms includes a dual peak approach in which the distance to the object is determined based on a distance between two peaks for signals detected by the TOF module.

4. The method of claim 1 wherein at least one of the algorithms includes a dual peak approach in which the distance to the object is determined based on a distance between an object peak and a reference peak.

5. The method of claim 1 wherein at least one of the algorithms is based on detection of a peak falling edge.

6. The method of claim 1 wherein at least one of the algorithms is based on intensity of reflected power detected by the TOF module.

7. The method of claim 1 wherein at least one of the algorithms is based on intensity of ambient light detected by the TOF sensor.

8. The method of claim 1 wherein at least one of the algorithms is based on detecting parallax shift of light reflected by the object and analyzing an intensity image of single photon avalanche diodes.

9. A time-of-flight (TOF) module comprising:
   an optical emitter operable to emit radiation of a particular wavelength out of the module;
   a TOF sensor operable to detect radiation of the particular wavelength reflected by an object outside the module, the TOF sensor comprising an array of single photon avalanche photodiodes on a single substrate, the array of single photon avalanche diodes comprising a first set of single photon avalanche diodes and a second set of single photon avalanche diodes; and
   one or more processors operable to:
      perform a first measurement of the detected radiation by the first set of single photon avalanche diodes, wherein during the first measurement only the first set of single photon avalanche diodes is enabled;
      perform a second measurement of the detected radiation by the second set of single photon avalanche diodes, wherein during the second measurement only the second set of single photon avalanche diodes is enabled;
      produce a first histogram corresponding to the first measurement;
      produce a second histogram corresponding to the second measurement;
      use a first algorithm to provide an output indicative of distance to the object based on the detected radiation;
      use at least one second different algorithm to provide an output indicative of the distance to the object based on the detected radiation;
      wherein at least one of the first and second algorithms comprises detecting parallax shift of the radiation reflected by the object and comparing the first and second histograms; and
      combine the outputs of the first and at least one second algorithms to obtain an improved estimate of the distance to the object.

10. The TOF module of claim 9 wherein each of the first and second algorithms further provides an output representing a respective confidence level indicative of how accurately distance to the object has been extracted by the particular algorithm.

* * * * *